US009643115B2

(12) United States Patent
Convery

(10) Patent No.: US 9,643,115 B2
(45) Date of Patent: May 9, 2017

(54) VIBRATING SCREEN

(71) Applicant: CDE Global Limited, Cookstown, County Tyrone (GB)

(72) Inventor: Anthony Convery, Moneymore (GB)

(73) Assignee: CDE Global Limited, Cookstown, County (GB)

( * ) Notice: Subject to any disclaimer, the term of this patent is extended or adjusted under 35 U.S.C. 154(b) by 0 days.

(21) Appl. No.: 14/424,585

(22) PCT Filed: Aug. 30, 2013

(86) PCT No.: PCT/EP2013/068028
§ 371 (c)(1),
(2) Date: Feb. 27, 2015

(87) PCT Pub. No.: WO2014/033279
PCT Pub. Date: Mar. 6, 2014

(65) Prior Publication Data
US 2015/0217217 A1    Aug. 6, 2015

(30) Foreign Application Priority Data

Aug. 31, 2012 (GB) .................................. 1215562.8

(51) Int. Cl.
*B01D 35/20* (2006.01)
*B32B 15/01* (2006.01)
(Continued)

(52) U.S. Cl.
CPC ............ *B01D 35/20* (2013.01); *B01D 33/03* (2013.01); *B01D 33/0376* (2013.01); *B07B 1/28* (2013.01);
(Continued)

(58) Field of Classification Search
CPC ................ B01D 33/03; B01D 33/0353; B01D 33/0376; B01D 33/801; B01D 19/0073;
(Continued)

(56) References Cited

U.S. PATENT DOCUMENTS 3,020,986 A * 2/1962 Kirk .......................... B64C 3/00
 244/123.13
4,052,523 A * 10/1977 Rhodes ..................... B32B 3/12
 428/116
(Continued)

FOREIGN PATENT DOCUMENTS

DE        3935120        4/1991
EP        1060874        12/2000
(Continued)

OTHER PUBLICATIONS

International Search Report for corresponding PCT Application No. PCT/EP2013/068028, dated Nov. 19, 2013.
(Continued)

*Primary Examiner* — Katherine Zalasky
*Assistant Examiner* — Benjamin Lebron
(74) *Attorney, Agent, or Firm* — Gardner, Linn, Burkhart & Flory, LLP; Matthew D. Kendall

(57) ABSTRACT

A vibrating screen is provided for separating excess water from particulate materials such as sand, gravel, iron ore, sludge or other particulate material and/or for grading, classifying or sorting particulate material by size. The vibrating screen includes a frame upon which is mounted a deck having a plurality of apertures therein, the frame being mounted on a base and being provided with vibration generating means for imparting vibration to the deck, wherein the frame includes pair of substantially parallel side walls between which the screen is mounted, each side wall including a pair of spaced apart side members defining outer (Continued)

faces of the side wall, at least one intermediate member being located between the side members, wherein the at least one intermediate member incorporates a plurality of apertures and/or cut-outs therethrough.

7 Claims, 3 Drawing Sheets

(51) Int. Cl.
  *B01D 33/03* (2006.01)
  *E21B 21/06* (2006.01)
  *B07B 1/46* (2006.01)
  *B07B 1/28* (2006.01)
  *B32B 15/00* (2006.01)

(52) U.S. Cl.
  CPC ............. *B07B 1/46* (2013.01); *B32B 15/00* (2013.01); *B32B 15/01* (2013.01); *B32B 15/011* (2013.01); *E21B 21/065* (2013.01); *B07B 2201/00* (2013.01); *B07B 2230/01* (2013.01)

(58) Field of Classification Search
  CPC .......... B01D 2201/204; B01D 2201/00; B01D 2201/04; B07B 1/28; B07B 1/46; B07B 13/16; B07B 2230/01; B07B 2201/00; F26B 5/12; F26B 20/00; E21B 21/065; B03B 4/005; B03B 4/02; B32B 15/01; B32B 15/011; B32B 3/12; B32B 15/00
  See application file for complete search history.

(56) References Cited

U.S. PATENT DOCUMENTS

| 4,416,349 A | * | 11/1983 | Jacobs | ............... G10K 11/16 181/208 |
| 5,192,623 A | | 3/1993 | Gewelber | |
| 2004/0075023 A1 | * | 4/2004 | Assler | ............... B32B 7/12 244/117 R |
| 2008/0078699 A1 | * | 4/2008 | Carr | ............... E21B 21/065 209/233 |

FOREIGN PATENT DOCUMENTS

| GB | 1469493 | 4/1977 |
| JP | 2000-189896 | 7/2000 |
| JP | 2001-300426 | 10/2001 |
| WO | 98/07529 | 2/1998 |
| WO | 98/16328 | 4/1998 |
| WO | 2011/113132 | 9/2011 |

OTHER PUBLICATIONS

UK Search Report for corresponding UK Application No. GB1215562.8, dated Dec. 19, 2012.
UK Examination Report under Section 18(3) for corresponding UK Application No. GB1215662.8, dated Sep. 9, 2014.

* cited by examiner

VIBRATING SCREEN

FIELD OF THE INVENTION

This invention relates to a vibrating screen and in particular to a vibrating screen for separating excess water from particulate material, such as sand, gravel, iron ore, sludge or other particulate material and/or for grading, classifying or sorting particulate material by size.

BACKGROUND OF THE INVENTION

Vibrating screens are commonly used to separate excess water from particulate materials, for example in sand quarrying to remove excess water from sand following grading and/or washing processes, and are used to sort, grade or classify particulate material, such as sand.

A typical vibrating screen comprises a frame, defied by a pair of substantially parallel side walls interconnected by transversely extending bridging members, upon which is mounted a substantially horizontal polyurethane deck having small openings or slots for water and/undersize particles to pass through. The deck is vibrated at high frequency to shake out excess water and/or undersize material through the openings and to convey the material across the deck to one end of the screen whereby the dry and/or oversize material is discharged over the top of a dam bar onto a conveyor or into a collection bay or hopper. The frame is mounted on a base via resilient linkages, such as springs, and the frame, and thus the deck, is typically vibrated by means of a pair of counter rotating rotors defining eccentric masses, driven by one or more drive motors, to impart circular or reciprocating vibratory motion to the deck.

The motors and rotors are typically are mounted on the frame by means of a heavy motor bridge attached to the side walls of the frame to extend over the deck. The motors and rotors are typically arranged side by side on the motor bridge in a plane extending transverse to the deck and are inclined relative to the deck to provide a reciprocating vibratory motion to the material on the deck to convey the material towards the dam bar. The rotors are typically arranged to rotate in opposite directions in phase with one another to generate vibrations in a plane substantially perpendicular to said inclined plane in which the motors are mounted.

Since the frame is subjected to vibrations, its must be constructed to be strong enough to withstand the dynamic stresses imparted due to vibrations generated by the rotors without undue stress or distortion. This requires the side walls in particular to be formed from a relatively heavy construction, typically comprising a plurality of steel plates and cooperating sections and reinforcing members welded together. However, increasing the strength of the frame, for example by increasing the thickness of the material from which the frame is made, also typically results in a corresponding increase in the weight of the frame, resulting in an increase in the stresses to which the frame is exposed and also increasing the load and stresses on the other components of the apparatus, in particular upon the base upon which the frame is supported. In addition, increasing the mass of the frame increases the vibration forces that must be generated by the rotors to achieve the required motion of the deck. Previous attempts to increase the strength of the frame without substantially increasing its weight have resulted in complex structures that are time consuming and costly to manufacture.

SUMMARY OF THE INVENTION

According to a first aspect of the present invention there is provided a vibrating screen having a frame upon which is mounted a deck having a plurality of apertures or slots therein. The frame is mounted on a base and is provided with vibration generating means for imparting vibration to the deck, wherein the frame includes pair of substantially parallel side walls between which the screen is mounted, each side wall having a pair of spaced apart side members defining outer faces of the side wall and at least one intermediate member located between the side members, the at least one intermediate member incorporating a plurality of apertures and/or cut-outs therethrough.

The material of the intermediate member surrounding the plurality of apertures and/or cut-outs may define a peripheral border region around the periphery of the intermediate member and a plurality of interconnected elongate webs and/or elongate reinforcing members. Thus the apertures and/or cut-outs formed in the intermediate member can be shaped to define a predetermined pattern of webs and reinforcing members therebetween to add stiffness and strength to the side walls while minimising the weight of the side walls of the frame.

In one embodiment the apertures and/or cut-outs comprise over 50% of the surface area of the intermediate member. The apertures and/or cut-outs may comprise over 75% of the surface area of the intermediate member.

Preferably each of the side members of the side walls comprise a planar plate, preferably formed from a sheet material, more preferably sheet steel.

In one embodiment the intermediate member comprises a plate of sheet material, more preferably sheet metal, such as sheet steel, having apertures and/or cut-outs therethrough to define hollow regions separated by reinforcing webs within the assembled side wall.

In one embodiment each side wall comprises a pair of side members and a single intermediate member located between the side members, the intermediate member having apertures and/or cut-outs therethrough to define hollow regions separated by reinforcing webs and elongate reinforcing members within the assembled side wall.

Preferably the side members and the intermediate member of each side wall of the frame are clamped together by a plurality of mechanical fasteners extending between the side members. Thus each side wall defines a laminated construction. Preferably the fasteners comprise nut and bolts or similar threaded fasteners.

Optionally, the side walls of the frame are interconnected by a plurality of bridge members extending therebetween. One or more of the bridge members may comprise an elongate beam or tubular member. In one embodiment the bridge members are connected to the side walls via mechanical fasteners, such as nuts and bolts or similar threaded fasteners.

By providing a bolted construction heat related problems associated with welded structures, such as the introduction of stress hot spots, are avoided and assembly and manufacture of the apparatus is greatly facilitated.

Optionally, the vibration generating means is mounted on or within a respective bridge member extending between the side walls of the frame. The bridge member may be located above or beneath the deck.

These and other objects, advantages and features of the invention will become apparent upon review of the following specification in conjunction with the drawings.

BRIEF DESCRIPTION OF THE DRAWINGS

An embodiment of the present invention will now be described, by way of example only, with reference to the accompanying drawings, in which.

DESCRIPTION OF THE PREFERRED EMBODIMENTS

Figure 3:
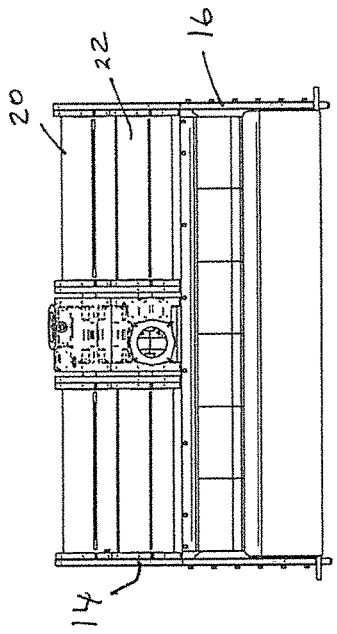
FIG. 3 is an end view of the dewatering screen of FIG. 1.
Figure 1:
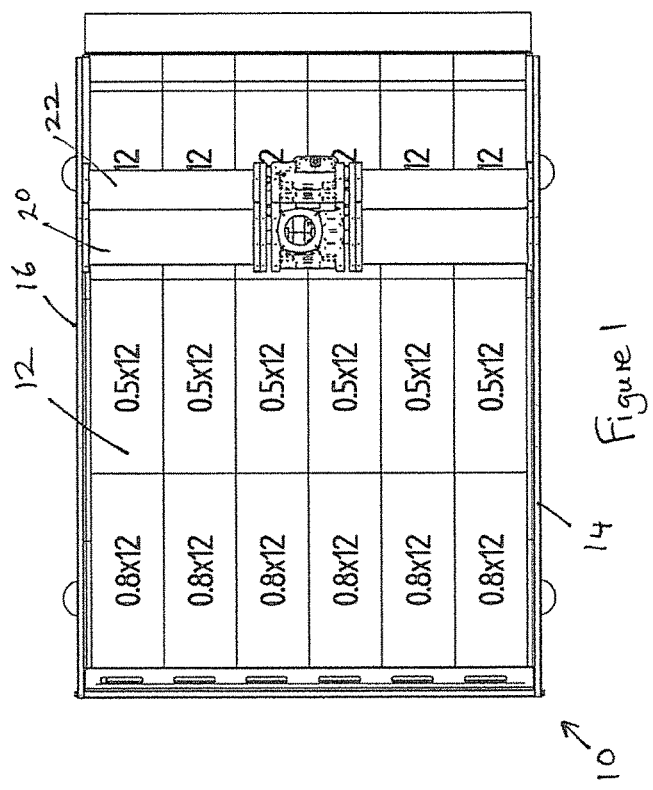
FIG. 1 is a plan view of a dewatering screen in accordance with an embodiment of the present invention.
Figure 2:
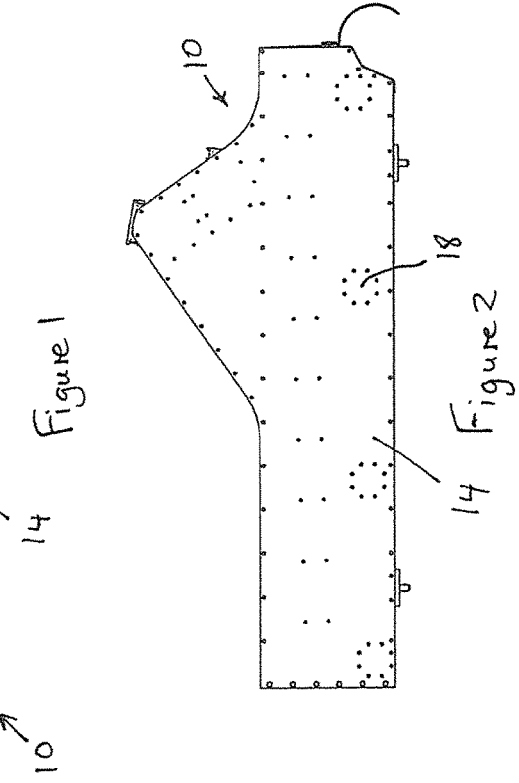
FIG. 2 is a side view of the dewatering screen of FIG. 1.
Figure 4:
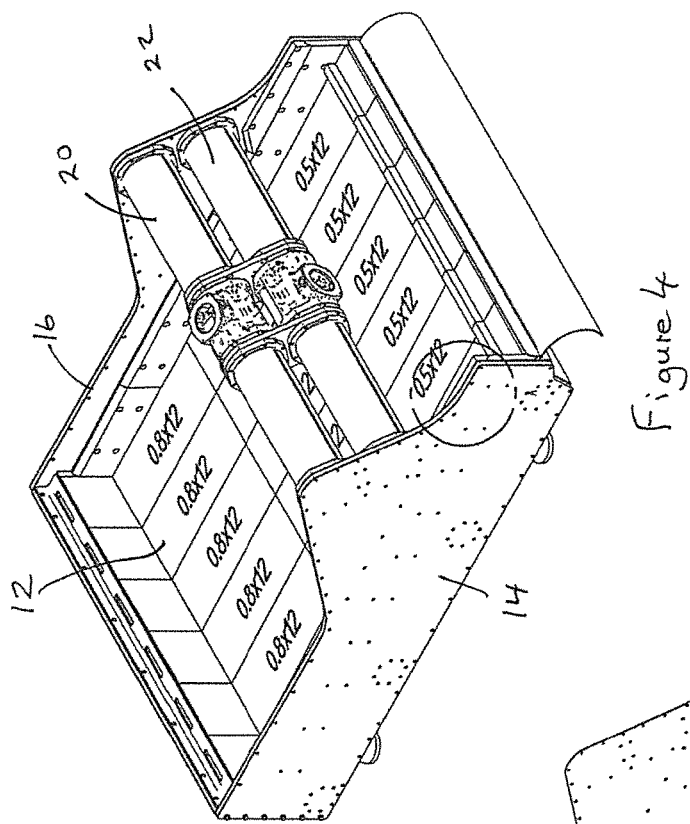
FIG. 4 is a perspective view of the dewatering screen of FIG. 1.

A dewatering screen in accordance with a first embodiment of the present invention is illustrated in FIGS. 1 to 6. The dewatering screen 10 comprises a modular polyurethane deck 12 having a plurality of small slots formed therein (of approximately 0.5 to 0.8 mm width). The deck 12 is mounted on a support frame comprises spaced apart side walls 14,16 joined by transversely extending bridging members 18. The support frame may be mounted on a base frame (not shown) via resilient mountings to allow the support frame to move with respect to the base frame. The support frame may be suspended from the base frame via suitable resilient mounts, such as springs.

A vibration generating means is mounted between the side plates 14,16 of the support frame, extending transverse to the deck 12 of the dewatering screen 10. The vibration generating means may comprise a pair of motor driven eccentrically loaded rotors mounted in or on support pipes 20,22 mounted between the side plates 14,16 for rotation about substantially parallel rotational axes extending transverse to the deck 12 or a single eccentrically driven rotor. The rotor or rotors may be adpated to generate a reciprocal or rotary motion to the deck 12. While the rotors are shown in drawings as being mounted above the deck 12, it is envisaged, that the or each rotor may be mounted beneath the deck 12, preferably within a tube mounted between the side plates.

Rotation of the rotor or rotors causes a rotating out of balance force to be applied to the support frame, imparting a vibratory motion to the deck 12 and to the material carried thereon. Such vibratory motion causes the material placed on the deck to be agitated, preventing blocking of the openings in the deck and causing material on the deck 12 to be conveyed towards one end of the screen 10.

The ends of each tubular support pipe 20,22 are bolted to the adjacent side plate. Thus the tubular support pipes 20,22 of the rotors form structural components of the frame of the dewatering screen, linking the side walls 14,16 of the frame.

Figure 5:
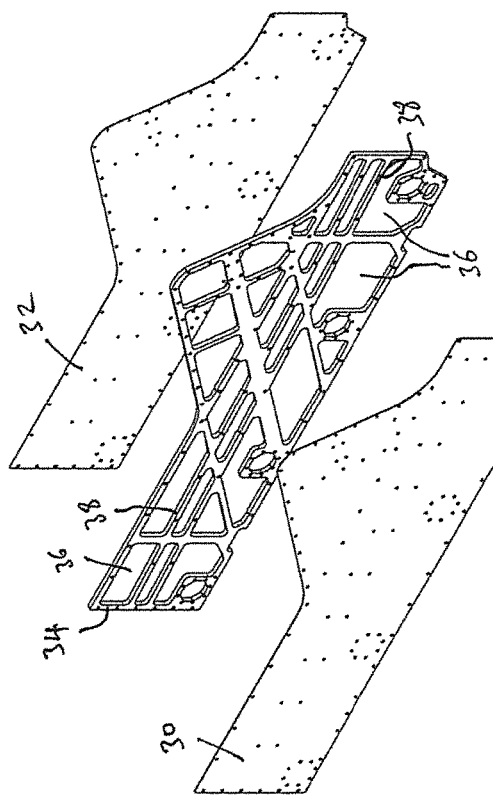
FIG. 5 is an exploded view of one of the side walls of the dewatering screen of FIG.
Figure 6:
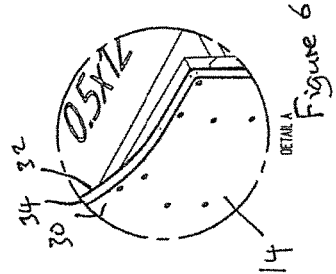
FIG. 6 is a detailed view of one of the side walls of the dewatering screen of FIG. 1.
Figure 7B:
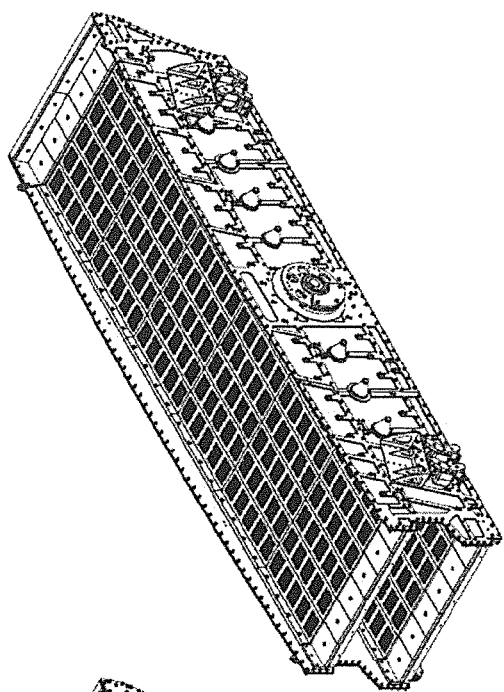
FIGS. 7A to 7D are perspective views of further examples of vibratory screens according to further embodiments of the present invention.
Figure 7D:
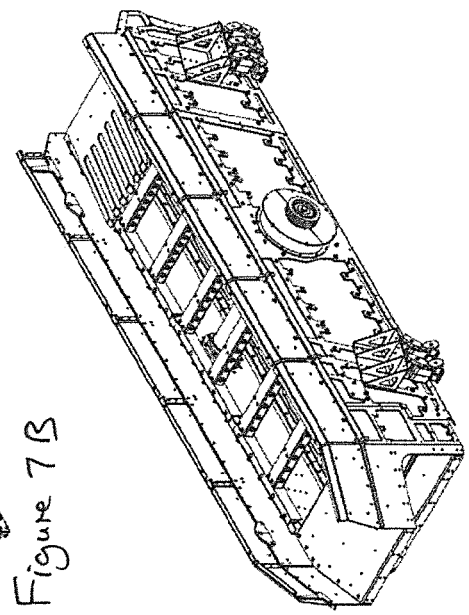
Figure 7A:
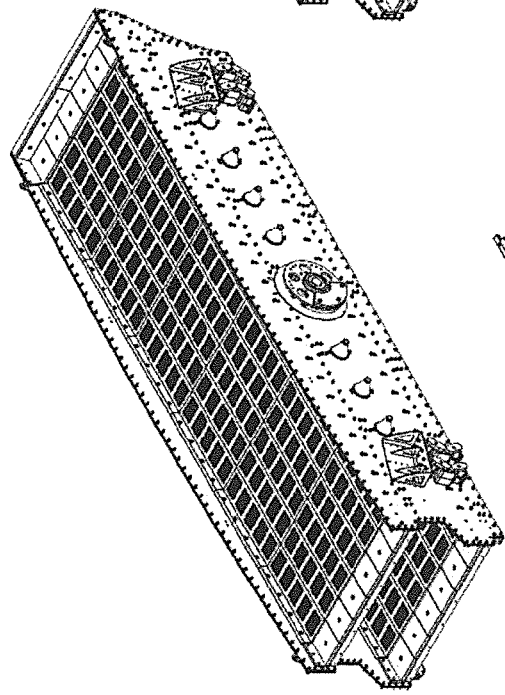
Figure 7C:
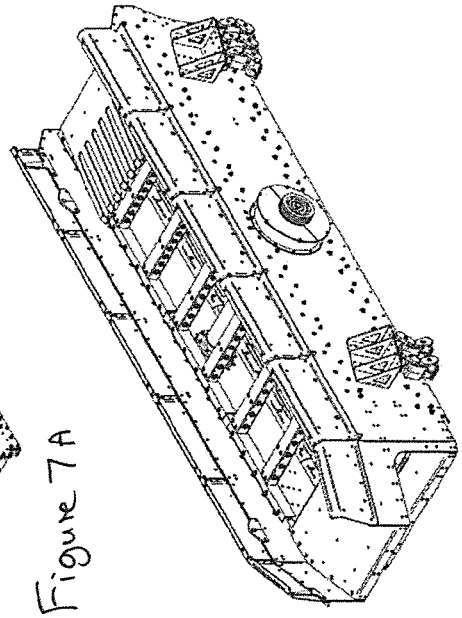

In the embodiment illustrated in FIG. 5, each side wall 14,16 of the frame is made up on a laminated assembly of approximately 4 mm thick outer steel plates 30,32 defining outer skins of the respective side wall and an approximately 20 mm thick intermediate steel plate 34 mounted therebetween. The outer skins 30,32 and intermediate plate 34 being clamped and connected together by nuts and bolts passing through the assembled plates. The intermediate plate 34 has a plurality of cut-outs 36 formed therein defining hollow regions surrounded by elongate reinforcing webs and members 38. The shape and positions of the cut-outs 36 can be selected to provide particular structural properties, such that the stiffness and strength of the side walls 14,16 can be optimised while minimising the weight of the side walls 14,16 of the frame.

The side walls 14,16 are interconnected by elongate bridging members 18 in the form of tubular beams. Again the ends of the beams are bolted to the side walls so that the frame can be assembled without welding, making the frame cheaper and easier to fabricate while avoiding the heat problems associated with welding (such as distortion and embrittlement of the steel components).

While the present invention has been described in the form of a dewatering screen, the invention could be applied to any type of vibrating screen having one or more decks, for example a vibratory screen for screening, grading or classifying particulate materials, such as sand, gravel, iron ore or any other particulate material. The dimensions of the side walls 14,16, in particular the thickness of the outer skins and intermediate plate and the pattern and arrangement of the cut-outs and apertures in the intermediate plate, may be adjusted to suit the application for which the vibratory screen is to be used. FIGS. 7A to 7D illustrate further examples of vibratory screens having side walls formed in accordance with the present invention. In such examples, the vibration generating eccentrically loaded rotor is mounted within a tubular member extending between the sides plates, beneath an upper deck of the screen, for imparting a circular motion to the decks.

The invention is not limited to the embodiment(s) described herein but can be amended or modified without departing from the scope of the present invention. Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A vibrating screen for grading or dewatering particulate material comprising:
   a frame upon which is mounted a deck having a plurality of apertures or slots therein, the frame being mounted on a base and being provided with a vibration generator for imparting vibration to the deck;
   wherein the frame comprises a pair of substantially parallel side walls between which the screen is mounted, each side wall comprising a pair of spaced apart side plates defining outer faces of the side wall, and an intermediate plate being located between the side plates;
   the intermediate plate incorporating a plurality of cut-outs formed therethrough for weight reduction, wherein the material of the intermediate plate surrounding the plurality of cut-outs defines a peripheral border region and a plurality of interconnected reinforcing webs and elongate reinforcing members within the side wall, wherein at least a subset of the plurality of cut-outs have elongate shapes with longer dimensions in the direction of the elongate reinforcing members, and at least a subset of the plurality of interconnected reinforcing webs are arranged at angles to intersect the elongate reinforcing members;
   wherein the side plates and the intermediate plate are formed from sheet steel, the intermediate plate having a greater thickness than that of the adjacent side plates, such that the side plates define outer skins of each side wall while the intermediate plate is configured to provide structural strength;

wherein the side plates and the intermediate plate of each side wall of the frame are clamped together exclusively by a first plurality of threaded fasteners extending between the side plates, wherein the side walls of the frame are interconnected by a plurality of bridge members extending therebetween, and wherein the bridge members are connected to the side walls via a second plurality of threaded fasteners.

2. A vibrating screen as claimed in claim 1, wherein the plurality of cut-outs comprise over 50% of the surface area of the intermediate member.

3. A vibrating screen for grading or dewatering particulate material, the vibrating screen comprising:

a frame upon which is mounted a deck having a plurality of apertures or slots therein, the frame being mounted on a base and being provided with a vibration generator for imparting vibration to the deck;

wherein the frame comprises a pair of substantially parallel side walls between which the screen is mounted, each side wall comprising a pair of spaced apart side plates defining outer faces of the side wall, and an intermediate plate being located between the side plates;

the intermediate plate incorporating a plurality of cut-outs formed therethrough, wherein the plurality of cut-outs comprise over 75% of the surface area of the intermediate plate, wherein the material of the intermediate plate surrounding the plurality of cut-outs defines a peripheral border region and a plurality of interconnected reinforcing webs and elongate reinforcing members within the side wall, wherein at least a subset of the plurality of cut-outs have elongate shapes with longer dimensions in the direction of the elongate reinforcing members;

wherein the side plates and the intermediate plate are formed from sheet steel, the intermediate plate having a greater thickness than that of the adjacent side plates, such that the side plates define outer skins of each side wall while the intermediate plate is configured to provide structural strength;

wherein the side plates and the intermediate plate of each side wall of the frame are clamped together exclusively by a first plurality of threaded fasteners extending between the side plates;

wherein the side walls of the frame are interconnected by a plurality of bridge members extending therebetween; and wherein the bridge members are connected to the side walls via a second plurality of threaded fasteners.

4. A vibrating screen as claimed in claim 1, wherein the first and second pluralities of threaded fasteners comprise threaded bolts.

5. A vibrating screen as claimed in claim 1, wherein the bridge members comprise elongate beams or tubular members.

6. A vibrating screen as claimed in claim 1, wherein the vibration generator is mounted on one of the bridge members extending between the side walls of the frame.

7. A vibrating screen as claimed in claim 3, wherein the first and second pluralities of threaded fasteners comprise nuts and bolts.

\* \* \* \* \*